United States Patent
Hashimoto et al.

(10) Patent No.: US 6,975,295 B2
(45) Date of Patent: Dec. 13, 2005

(54) LIQUID CRYSTAL DISPLAY DEVICE

(75) Inventors: Yuuichi Hashimoto, Mobara (JP); Tsutomu Kasai, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/972,932

(22) Filed: Oct. 10, 2001

(65) Prior Publication Data

US 2002/0050967 A1    May 2, 2002

(30) Foreign Application Priority Data

Nov. 27, 2000    (JP)    .......................... 2000-359522

(51) Int. Cl.$^7$ ............................................ G09G 3/36
(52) U.S. Cl. ............................ 345/87; 345/93; 349/55
(58) Field of Search ............................. 345/87, 88, 89, 345/92–93, 100; 349/43, 110, 44, 147, 55

(56) References Cited

U.S. PATENT DOCUMENTS

| | | | | |
|---|---|---|---|---|
| 5,062,690 A | * | 11/1991 | Whetten ..................... | 349/55 |
| 5,086,347 A | * | 2/1992 | Ukai et al. .................. | 349/55 |
| 5,164,851 A | * | 11/1992 | Kanemori et al. ........... | 349/55 |
| 5,260,818 A | | 11/1993 | Wu | |
| 5,561,440 A | | 10/1996 | Kitajima et al. | |
| 5,847,781 A | | 12/1998 | Ono et al. | |
| 6,023,260 A | * | 2/2000 | Higashi ..................... | 345/100 |
| 6,429,907 B1 | | 8/2002 | Park et al. | |
| 6,429,909 B1 | | 8/2002 | Kim et al. | |
| 6,433,764 B1 | * | 8/2002 | Hebiguchi et al. .......... | 345/87 |
| 6,456,013 B1 | * | 9/2002 | Komiya et al. ............. | 315/169.1 |
| 6,476,882 B1 | | 11/2002 | Sakurai | |
| 6,496,170 B1 | * | 12/2002 | Yoshida et al. ............. | 345/87 |
| 6,498,595 B1 | * | 12/2002 | Knapp et al. ............... | 345/94 |
| 6,522,315 B2 | * | 2/2003 | Ozawa et al. ............... | 345/92 |
| 6,525,705 B1 | * | 2/2003 | Ishii et al. .................. | 345/87 |

FOREIGN PATENT DOCUMENTS

| | | |
|---|---|---|
| JP | 4-318522 | 4/1991 |
| JP | 05-019294 | 7/1991 |
| JP | 5-142570 | 11/1991 |
| JP | 9-33951 | 7/1995 |
| JP | 2000-292803 | 4/1999 |
| KR | 95-15152 | 6/1995 |
| KR | 95-151520 | 6/1995 |
| KR | 2000-0020855 | 9/1998 |
| KR | 2000-0056613 | 2/1999 |
| TW | 196866 | 8/1992 |

\* cited by examiner

*Primary Examiner*—Alexander Eisen
*Assistant Examiner*—Kimnhung Nguyen
(74) *Attorney, Agent, or Firm*—Reed Smith LLP; Stanley P. Fisher, Esq.; Juan Carlos A. Marquez, Esq.

(57) ABSTRACT

An object of the invention is to repair a drain signal line easily. Each region enclosed by two gate signal lines adjacent to each other and two drain signal lines adjacent to each other that are formed on the liquid-crystal-side surface of one of transparent substrates that are opposed to each other with a liquid crystal interposed in between is made a pixel region. Each pixel region is provided with a switching element that is driven being supplied with a scanning signal from one of the two gate signal lines and a pixel electrode that is supplied, via the switching element, with a video signal from one of the two drain signal lines. A repair conductive layer is formed so as to be contained in each drain signal line when viewed perpendicularly with an insulating film interposed in between.

12 Claims, 6 Drawing Sheets

LIQUID CRYSTAL DISPLAY DEVICE

BACKGROUND OF THE INVENTION

1. Field of the Invention

The present invention relates to a liquid crystal display device and, in particular, to an active matrix liquid crystal display device.

2. Description of the Related Art

In active matrix liquid crystal display devices, each of regions that are formed on the liquid-crystal-side surface of one of transparent substrates opposed to each other with a liquid crystal interposed in between and that are enclosed by gate signal lines extending in the x direction and arranged in the y direction and drain signal lines extending in the y direction and arranged in the x direction is made a pixel region. Each pixel region is provided with a thin-film transistor that is driven being supplied with a scanning signal from one of the gate signal lines that define the pixel region and a pixel electrode that is supplied, via the thin-film transistor, with a video signal from one of the drain signal lines that define the pixel region.

Each of the above signal lines, thin-film transistors, pixel electrodes, etc. is formed by laying one on another a conductive layer, a semiconductor layer, and an insulating layer each of which is formed in a prescribed pattern by selective etching according to a photolithography technique.

As for recent high-resolution liquid crystal display devices, a problem of signal line disconnection is pointed out that occurs occasionally due to small signal line widths.

A technique for solving such a problem is disclosed in Japanese Patent Laid-Open No. 19294/1993. This technique prevents what is called a line defect that is caused by disconnection of a source signal line by forming, in each pixel, an electrical path of a source electrode (of a thin-film transistor)→a gate electrode (of the thin-film transistor)→a drain electrode (of the thin-film transistor)→a pixel electrode→a first conductor piece→a second conductor piece→a drain signal line by applying laser light to five locations, for example.

However, requiring two or more times of laser light application (specifically, five times more laser light) to repair a drain signal line, this technique has a problem that such work is cumbersome.

Since the first conductor piece and the second conductor piece need to be formed in each pixel region, this technique has another problem that the aperture ratio is lowered.

This technique has a further problem that point defects (pixel defects) are unavoidable though it can prevent line defects.

SUMMARY OF THE INVENTION

The present invention has been made in view of the above circumstances in the art, and an object of the invention is therefore to provide a liquid crystal display device in which a drain line can be repaired easily.

Another object of the invention is to provide a liquid crystal display device that does not obstruct increase of the pixel aperture ratio.

A further object of the invention is to provide a liquid crystal display device in which a point defect, not to mention a line defect, does not occur.

A typical aspect of the invention will be briefly summarized below.

Each region enclosed by two gate signal lines adjacent to each other and two drain signal lines adjacent to each other that are formed on the liquid-crystal-side surface of one of substrates that are opposed to each other with a liquid crystal interposed in between is made a pixel region. Each pixel region is provided with a switching element that is driven being supplied with a scanning signal from one of the two gate signal lines and a pixel electrode that is supplied, via the switching element, with a video signal from one of the two drain signal lines. A repair conductive layer is formed so as to be contained in each drain signal line when viewed perpendicularly with an insulating film interposed in between.

In the liquid crystal display device having the above configuration, when a disconnection occurs in a drain signal line, laser light is applied to two locations of the disconnected drain signal line on both sides of the disconnected portion, whereby the parts of the drain signal line on both side of the disconnected portion are connected to each other via the repair conductive film, that is, the disconnected drain signal line is repaired. This is done by only two applications of laser light.

Since each repair conductive layer is formed so as to be contained in the associated drain signal line when viewed perpendicularly, it does not prevent increase of the pixel aperture ratio.

Further, a disconnected drain line is repaired by not using a member located in a pixel region, the repairing does not cause any pixel defect,

DESCRIPTION OF THE PREFERRED EMBODIMENTS

Liquid crystal display devices according to embodiments of the present invention will be hereinafter described.

Embodiment 1

<Equivalent Circuit>

Figure 2:
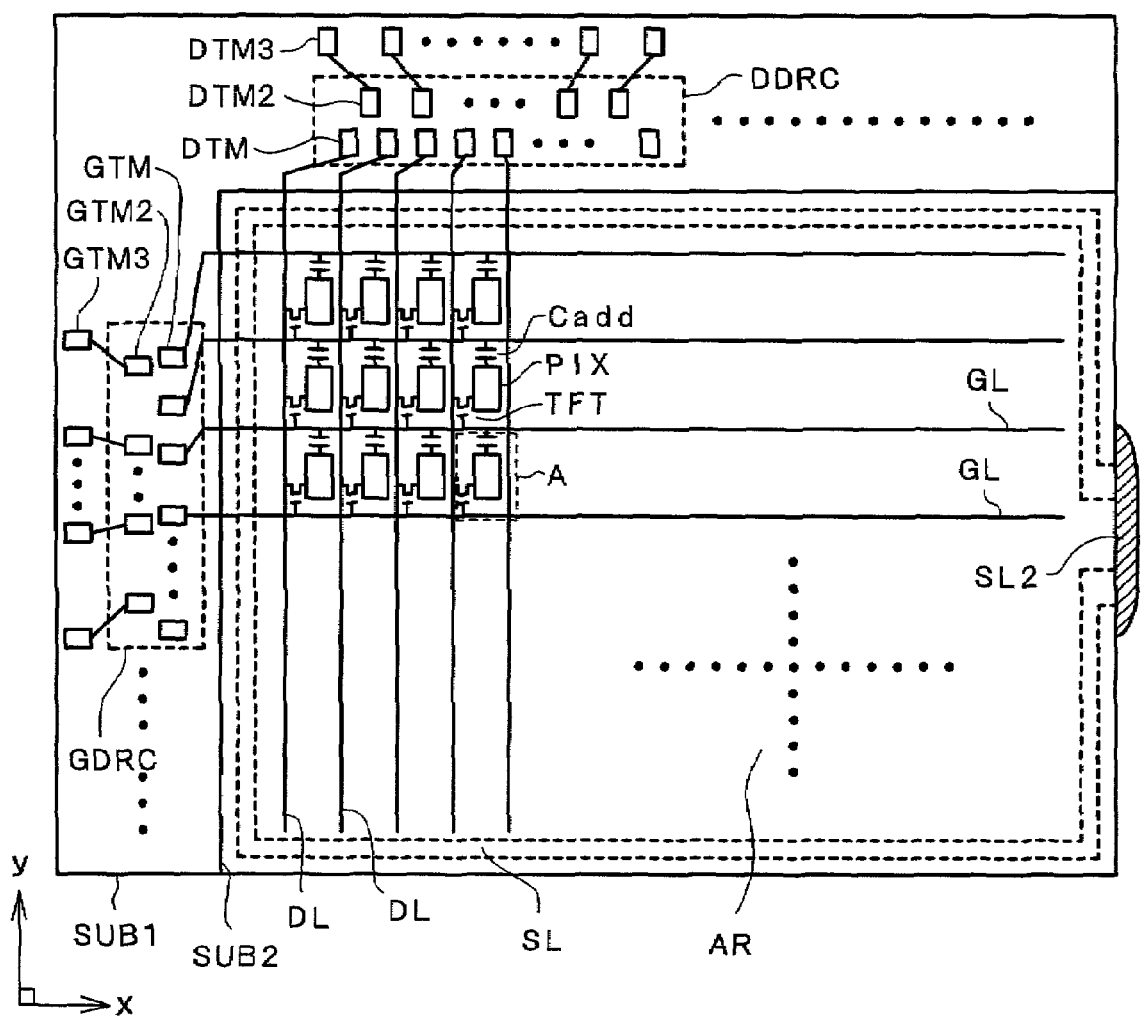
FIG. 2 is an equivalent circuit diagram of the liquid crystal display device according to the first embodiment of the invention.

FIG. 2 is an equivalent circuit diagram of a liquid crystal display device according to a first embodiment of the invention. Although FIG. 2 is a circuit diagram, it is so drawn as to correspond to an actual geometrical arrangement.

As shown in FIG. 2, a transparent substrate SUB1 is opposed to the other transparent substrate SUB2 with a liquid crystal interposed in between.

Gate signal lines GL extending in the x direction and arranged in the y direction in FIG. 2 and drain signal lines DL extending in the y direction and arranged in the x direction in FIG. 2 are formed on the liquid-crystal-side surface of the transparent substrate SUB1. The drain signal lines DL are insulated from the gate signal lines GL. Each of the rectangular regions enclosed by the gate lines GL and the drain lines DL is made a pixel region. A display area AR is a collection of the pixel regions.

Each pixel region is provided with a thin-film transistor TFT that is driven being supplied with a scanning signal (voltage) from one of the gate signal lines GL that define the pixel region and a pixel electrode PIX that is supplied, via the thin-film transistor TFT, with a video signal (voltage) from a one of the drain signal lines DL that define the pixel region.

A capacitance element Cadd is formed between the pixel electrode PIX and the other of the gate signal lines GL that define the pixel region. The capacitance element Cadd serves to store, for a long time, a video signal that was supplied to the pixel electrode PIX even after the thin-film transistor TFT is turned off.

An electric field is generated between the pixel electrode PIX formed in each pixel region and a counter electrode CT (not shown) that is formed on the liquid-crystal-side surface of the transparent substrate SUB2 so as to be common to all the pixel regions. The light transmittance of a liquid crystal portion interposed between the pixel electrode PIX and the counter electrode CT is controlled in this manner.

Each gate signal line GL extends to one side (left side in FIG. 2) of the transparent electrode SUB1, and a terminal portion GTM that is connected to a bump of a semiconductor integrated circuit GDRC that is a vertical scanning circuit mounted on the transparent substrate SUB1 is formed at the end of the extension of the gate signal line GL. Each drain signal line DL extends to one side (top side in FIG. 2) of the transparent substrate SUB1, and a terminal portion DTM that is connected to a semiconductor integrated circuit DDRC that is a video signal driver circuit mounted on the transparent substrate SUB1 is formed at the end of the extension of the drain signal line DL.

The semiconductor integrated circuits GDRC and DDRC themselves are completely mounted on the transparent substrate SUB1. This is what is called a COG (chip on glass) scheme.

The input-side bumps of the semiconductor integrated circuits GDRC and DDRC are connected to respective terminal portions GTM2 and DTM2 that are formed on the transparent substrate SUB1. The terminal portions GTM2 and DTM2 are connected, via wiring layers, to terminal portions GTM3 and DTM3, respectively, that are arranged in peripheral regions closest to the end faces of the transparent substrate SUB1.

The transparent substrate SUB2 is opposed to the transparent substrate SUB1 excluding the regions where the semiconductor integrated circuits GDRC and DDRC are formed, and hence the transparent substrate SUB2 has a smaller area than the transparent substrate SUB1.

The transparent substrate SUB2 is fixed to the transparent substrate SUB1 with a sealing member SL that is formed in a peripheral region of the transparent substrate SUB2. The sealing member SL also has a function of sealing the liquid crystal that is interposed between the transparent substrates SUB1 and SUB2.

<Pixel Structure>

Figure 1:
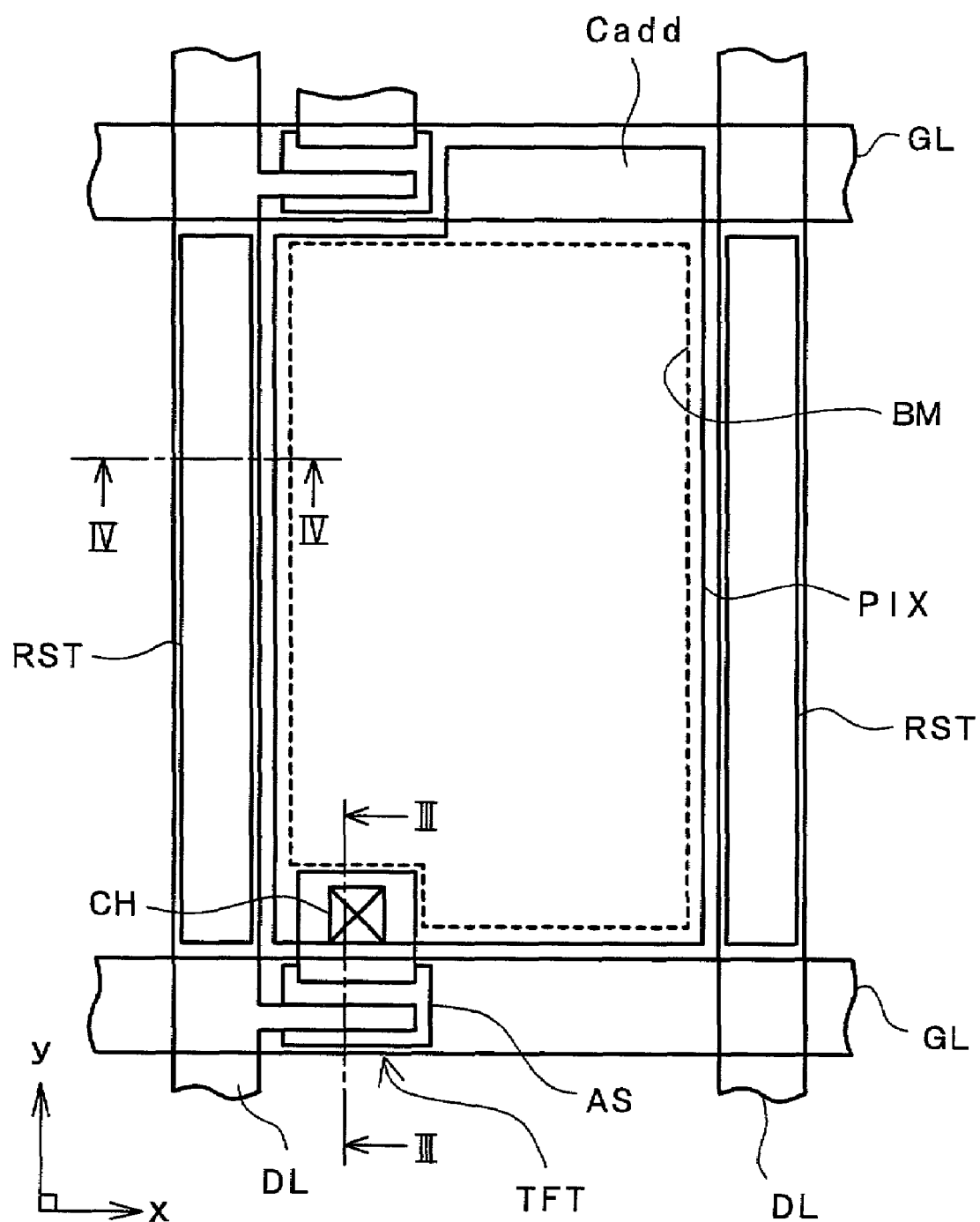
FIG. 1 is a plan view of one pixel of a liquid crystal display device according to a first embodiment of the present invention.

FIG. 1 is a plan view showing the structure of one pixel formed on the transparent substrate SUB1 and corresponds to part A enclosed by a broken line in FIG. 2.

Figure 3:
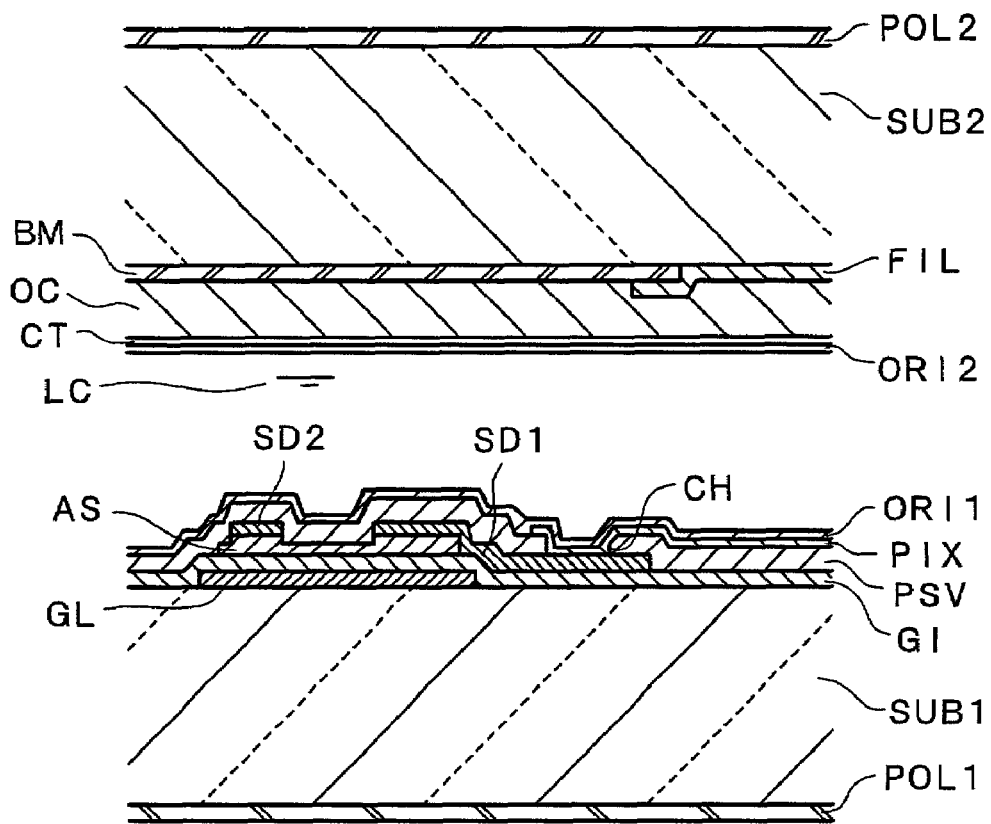
FIG. 3 is a sectional view taken along line III—III in FIG. 1.
Figure 4:
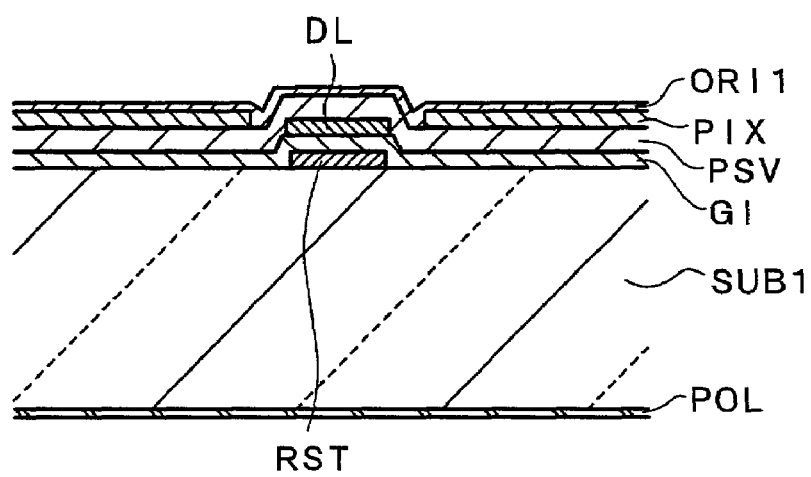
FIG. 4 is a sectional view taken along line IV—IV in FIG. 1.

FIG. 3 is a sectional view (including the substrate SUB2) taken along line III—III in FIG. 1. FIG. 4 is a sectional view taken along line IV—IV in FIG. 1.

As shown in FIG. 1, Gate signal lines GL are formed on the liquid-crystal-side surface of the transparent substrate SUB1 so as to extend in the x direction and arranged in the y direction.

Repair conductive layers RST, which were formed at the same time as the gate signal lines GL, are formed under drain signal lines DL (described later).

The repair conductive layers RST are physically isolated and hence electrically insulated from the gate signal lines GL.

An insulating film GI made of SiN, for example, is formed on the transparent substrate SUB1 so as to cover the gate signal lines GL and the repair conductive layers RST (see FIGS. 3 and 4).

The insulating film GI serves, for drain signal lines DL (described later), as an interlayer insulating film for insulation from the gate signal lines GL, as a gate insulating film of a thin-film transistor TFT (described later), and as a dielectric film of a capacitance element Cadd (described later).

An i-type (intrinsic; not doped with any conductivity type determining impurity) semiconductor layer AS made of a-Si, for example, is formed over the associated gate signal line GL in a bottom-left portion of each pixel region.

With a source electrode and a drain electrode formed thereon, the semiconductor layer AS serves as the semiconductor layer of a MIS thin-film transistor TFT having part of the associated gate signal line as a gate electrode.

A source electrode SD1 and a drain electrode SD2 of the thin-film transistor TFT were formed at the same time as drain signal lines DL that are formed on the insulating film GI.

The drain signal lines DL extend in the y direction and are arranged in the x direction in FIG. 1. The drain signal lines DL are formed over the repair conductive layers RST excluding regions where the gate signal lines GL are formed and their vicinities.

Part of each drain signal line DL extends so as to be located over the associated semiconductor layer AS and the extension serves as the drain electrode SD2 of the associated thin-film transistor TFT.

An electrode that was formed at the same time as the drain signal lines DL so as to be separated from the drain electrode SD2 is the source electrode SD1. The source electrode SD1 is connected to a pixel electrode PIX (described later). To secure a portion to be connected to the pixel electrode PIX, the source electrode SD1 has a small extension that extends to the pixel region.

A semiconductor layer doped with an impurity is formed between the semiconductor layer AS and each of the drain electrode SD2 and the source electrode SD1, and serves as a contact layer.

The above structure can be formed in the following manner. After the semiconductor layer AS is formed, a thin semiconductor layer that is doped with an impurity is formed on the surface of the semiconductor layer AS. Then, after the drain electrode SD2 and the source electrode SD1 are formed, the exposed parts of the impurity-doped semiconductor layer are etched away with the drain electrode SD2 and the source electrode SD1 used as a mask.

A passivation film PSV made of SiN, for example, is formed on the transparent substrate SUB1 (on which the drain signal lines DL plus the drain electrodes SD2 and the source electrodes SD1) are formed) so as to cover the drain signal lines DL etc. (see FIGS. 3 and 4).

The passivation film PSV is formed to prevent direct contact of the thin-film transistors TFT to the liquid crystal and other purposes. The passivation film PSV is formed with contact holes CH for exposing part of the extension of the source electrode SD 1 of each thin-film transistor TFT.

A transparent pixel electrode PIX made of ITO film (indium tin oxide), for example, is formed on the top surface of the passivation film PSV so as to cover most of the associated pixel region.

The pixel electrode PIX is formed so as to fill in the associated contact hole CH that is formed through the passivation film PSV, whereby the pixel electrode PIX is connected to the source electrode SD1 of the associated thin-film transistor TFT.

An alignment layer ORI1 is formed on the transparent substrate SUB1 (on which the pixel electrodes PIX are formed) so as to also cover the pixel electrodes PIX. The alignment layer ORI1 is made of a resin, for example, and its surface was rubbed in a prescribed direction. The alignment layer ORI1 is in contact with a liquid crystal LC, and the initial alignment direction of the liquid crystal LC is determined by the alignment layer ORI1 and another alignment layer ORI2 (described later).

A polarizer POL1 is attached to the surface of the transparent substrate SUB1 on the side opposite to the liquid crystal LC.

On the other hand, a black matrix BM is formed on the liquid-crystal-side surface of the transparent substrate SUB2 so as to define the individual pixel regions.

The black matrix BM is provided to prevent incidence of external light on the thin-film transistors TFT and to increase the display contrast.

Color filters FIL having colors corresponding to the respective kinds of pixel regions are formed in the respective apertures (i.e., light transmission regions that are substantially pixel regions) of the black matrix BM.

For example, color filters FIL of the same color are used for pixel regions that are arranged in the y direction and color filters FIL of red (R), green (G), and blue (B) are arranged periodically for pixel regions that are arranged in the x direction.

To prevent steps from appearing on the surface due to the black matrix BM and the color filters FIL, a planarization film OC, which is a resin film applied, for example, is formed on the transparent substrate SUB2 (on which the black matrix BM and the color filters FIL are formed) so as to cover the black matrix BM etc.

A counter electrode CT made of ITO, for example, is formed on the surface of the planarization film OC so as to be common to the pixel regions.

An electric field corresponding to a video signal (voltage) is generated between the counter electrode CT and the pixel electrode PIX in each pixel region is used to control the alignment direction of the part of the liquid crystal LC interposed between the above electrodes. The light transmittance is controlled by properly combining the liquid crystal alignment direction, the above-mentioned polarizer POL1, and another polarizer POL2 (described later).

An alignment layer ORI2 is formed on the transparent substrate SUB2 (on which the counter electrode CT is formed) so as to cover the counter electrode CT. The alignment layer ORI2 is made of a resin, for example, and its surface was rubbed in a prescribed direction. The alignment layer ORI2 is in contact with the liquid crystal LC, and the initial alignment direction of the liquid crystal LC is determined by the alignment layers ORI1 and ORI2.

A polarizer POL2 is attached to the surface of the transparent substrate SUB2 on the side opposite to the liquid crystal LC.

Figure 5:
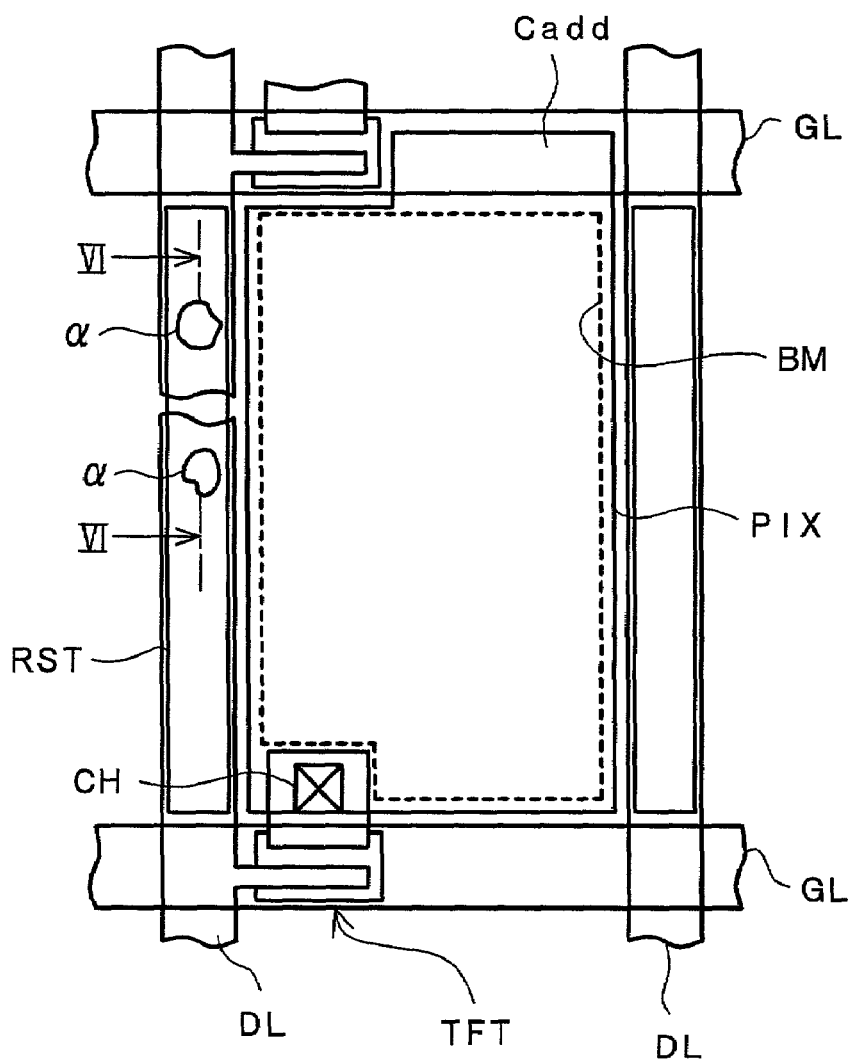
FIG. 5 illustrates an advantage of the liquid crystal display device according to the first embodiment of the invention.

In the liquid crystal display device having the above configuration, if a drain signal line DL is disconnected at a certain position as shown in FIG. 5, laser light is applied to two locations of the drain signal line DL on both sides of the disconnected portion.

Figure 6:
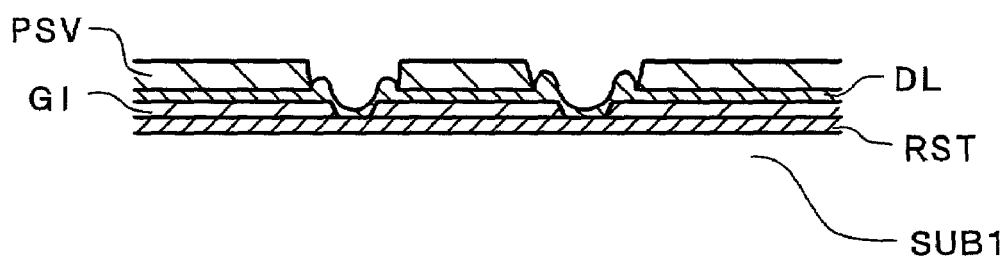
FIG. 6 is a sectional view taken along line VI—VI in FIG. 5.

As a result, melting portions a occur in the laser-light-applied locations of the drain signal line DL so as to penetrate the underlying insulating film GI and reach the repair conductive layer RST (see FIG. 6 taken along line VI—VI in FIG. 5).

The parts of the drain signal line DL that are located above and below the disconnected portion (as viewed in FIG. 5) are electrically connected to each other via the repair conductive layer RST and hence the disconnected drain signal line DL is repaired.

As is apparent from the above description, repair of one disconnection can be attained by two applications of laser light, providing an advantage that the repair work is easy.

Since the repair conductive layers RST are formed under the drain signal lines DL, they do not prevent increase of the pixel aperture ratio.

Further, since a drain line DL is repaired by not using a member (e.g., the pixel electrode PIX) located in a pixel region, the repairing does not cause any pixel defect.

Embodiment 2

Figure 7A:
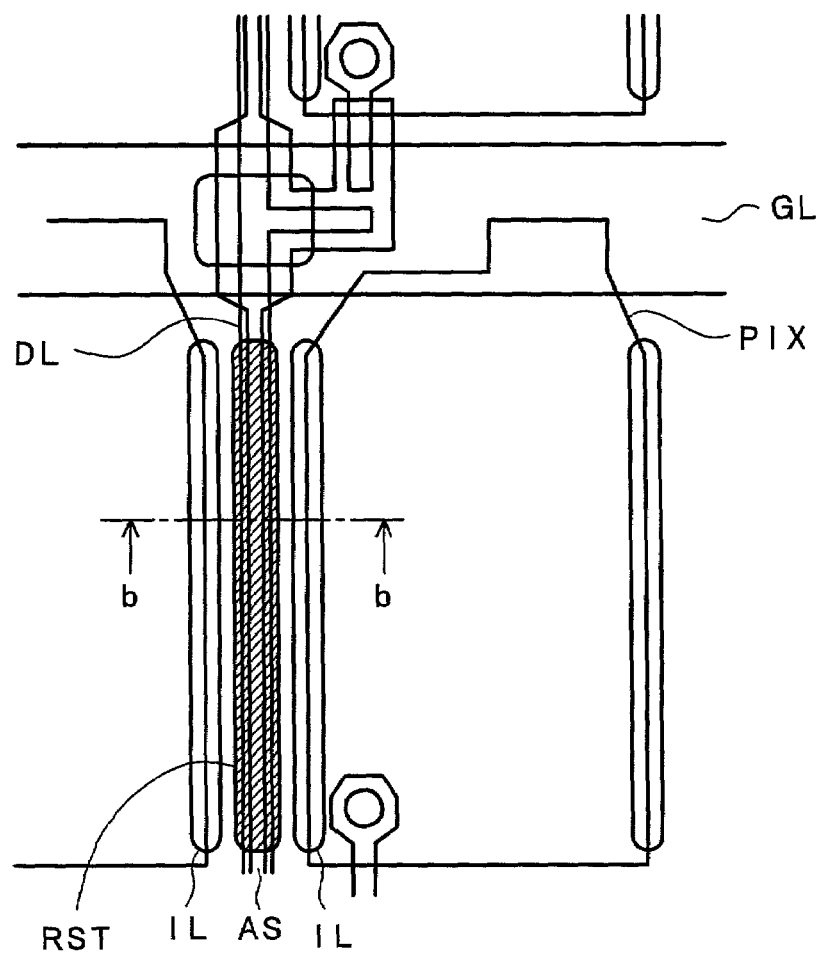
FIG. 7A is a plan view of one pixel of a liquid crystal display device according to a second embodiment of the present invention.
Figure 7B:
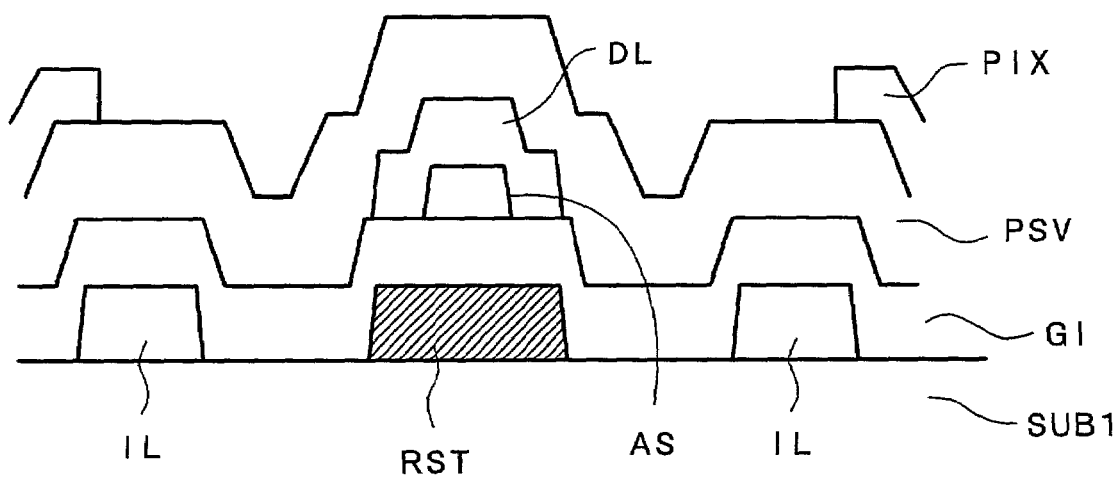
FIG. 7B is a sectional view taken along line b—b in FIG. 7A.

FIGS. 7A and 7B show the structure of one pixel of a liquid crystal display device according to a second embodiment of the invention. FIG. 7A is a plan view and FIG. 7B is a sectional view taken along line b—b in FIG. 7A.

The parts in FIGS. 7A and 7B that are given the same reference symbols as the corresponding parts in FIGS. 1, 3, and 4 are made of the same material and have the same function as the latter.

A first difference between the structure of FIGS. 7A and 7B and that of FIGS. 1, 3, and 4 is that semiconductor layers AS are formed immediately under the drain signal lines DL that are formed on the insulating film GI.

The above semiconductor layers AS are formed at the same time as the semiconductor layer AS of each thin film transistor TFT. Like the insulating film GI, the semiconductor layers AS under the drain signal lines DL are given a function of interlayer insulating films provided between the drain signal lines DL and the gate signal lines GL. It is intended to strength the interlayer insulation function.

Also in this embodiment, as in the case of the structure of FIGS. 1, 3 and 4, the repair conductive layers RST are formed under the drain signal lines DL in the layer under the insulating film GI.

Light shield films IL are formed on both sides of each drain signal line DL, that is, on both sides of each repair conductive layer RST. Like the black matrix BM that is formed on the transparent substrate SUB2, the light shield films IL has a light shield function. The presence of the light shield films IL makes it possible to decrease the width of the black matrix BM and to thereby provide an advantage of increasing the aperture ratio.

The light shield films IL can be formed at the same time as the repair conductive layers RST. This provides an advantage that electrical insulation can be attained by separating the light shield films IL from the associated repair conductive layers RST by a prescribed distance.

If the light shield films IL were electrically connected to the associated repair conductive layer RST, the light shield films IL would be connected to the associated drain signal line DL after its repairing. This would cause adverse effects on the pixel electrodes PIX that overlap with the respective light shield films IL.

Embodiment 3

Each of the first and second embodiments are directed to what is called a vertical electric field type pixel structure. However, it goes without saying that the invention is not limited to such a case and can be applied to a lateral electric field type one.

In lateral electric field type liquid crystal display devices, the structure of each drain signal line GL and its vicinity that is approximately the same as shown in FIG. 1 is employed in the invention, because conventional lateral electric field type liquid crystal display devices also have the above-described problems.

Figure 8:
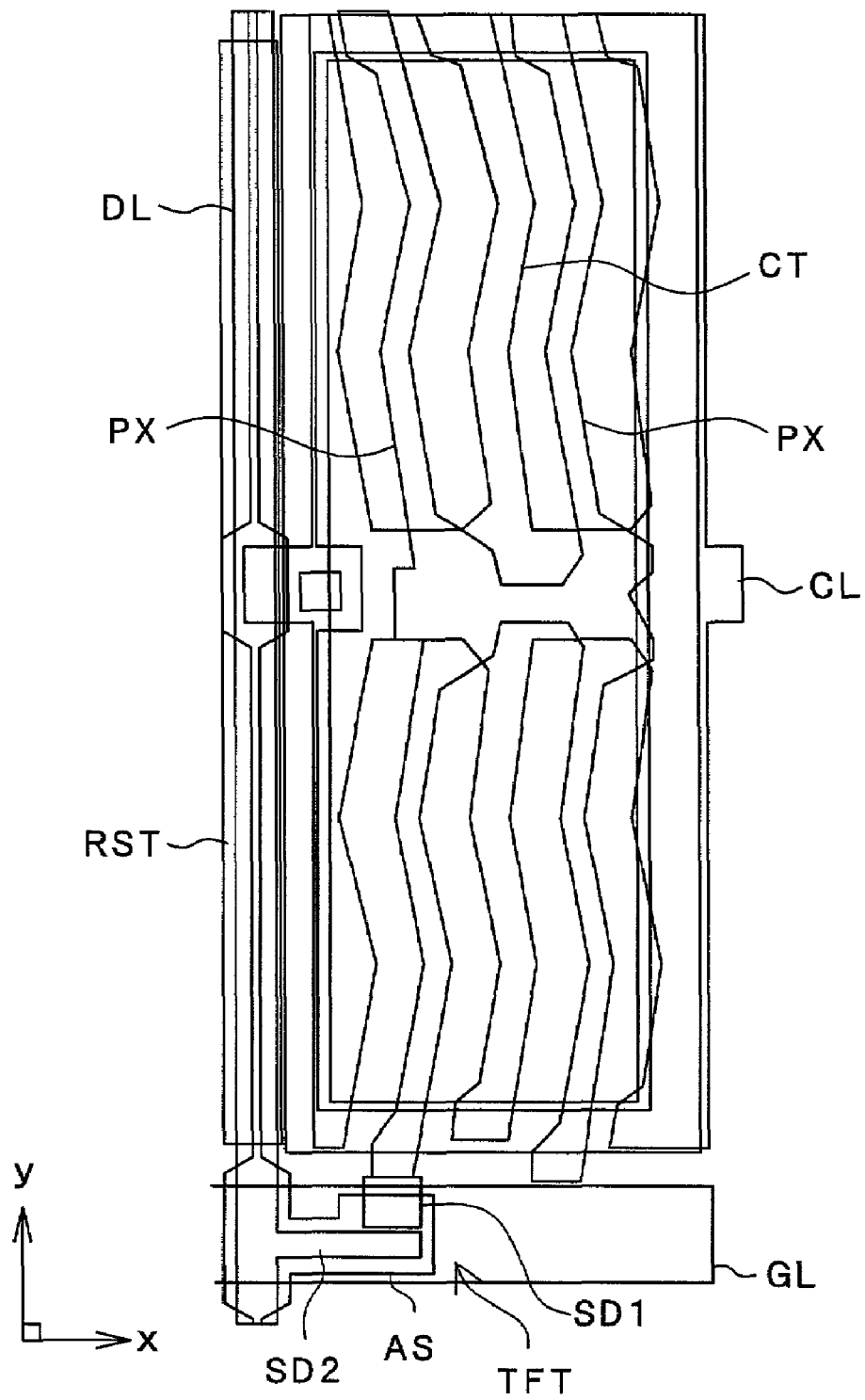
FIG. 8 is a plan view of one pixel of a liquid crystal display device according to a third embodiment of the present invention.

FIG. 8 is a plan view showing the structure of one pixel of a lateral electric field type liquid crystal display device according to a third embodiment of the invention.

In this liquid crystal display device, counter electrodes CT are formed on the liquid-crystal-side surface of a transparent substrate SUB1 (on which pixel electrodes PX are formed). The counter electrodes CT and the pixel electrodes PX are formed alternately in stripe patterns (extending in the y direction in FIG. 8).

The counter electrodes CT and the pixel electrodes PX are formed in different layers with an insulating film interposed in between. The components approximately parallel with the transparent substrate SUB1 of electric fields generated between the counter electrodes CT and the pixel electrodes PX are used to control the light transmittance of the liquid crystal.

The reason why each electrode has a plurality of bending portions in its extending direction is employment of what is called a multidomain scheme in which to prevent a hue variation that would otherwise occur when the display screen is observed from different directions, two kinds of regions are formed where the directions of an electric field developing between a pixel electrode PX and a counter electrode CT are different from each other.

As is apparent from the above description, a drain signal line can be repaired easily in the liquid crystal display device according to the invention.

What is claimed is:

1. A liquid crystal display device comprising:
a liquid crystal; and
two substrates opposed to each other with the liquid crystal interposed in between, the liquid crystal display device further comprising on a liquid-crystal-side surface of one of the two substrates:
a plurality of gate signal lines;
a plurality of drain signal lines that cross the plurality of gate signal lines;
pixel regions each enclosed by two gate signal lines adjacent to each other and two drain signal lines adjacent to each other;
a switching element that is provided in each pixel region and driven by a scanning signal supplied from one of the two gate signal lines that define the pixel region;
a pixel electrode that is provided in each pixel region and supplied, via the associated switching element, with a video signal from one of the two drain signal lines that define the pixel region;
an insulating film;
a repair conductive layer formed so as to be contained in each of the plurality of drain signal lines when viewed perpendicularly and to be insulated from said each of the plurality of drain signal lines with the insulating film interposed in between; and
a light shield film so formed along at least one side of the repair conductive layer that the light shield film is insulated from the repair conductive layer, the drain signal line and the pixel electrode, and that the light shield film is overlapped with the pixel electrode along an extending direction of the drain signal line.

2. A liquid crystal display device according to claim 1, wherein at least one of the plurality of drain signal lines has a disconnected portion and melt-formed portions that are located on both sides of the disconnected portion and penetrate the insulating film.

3. A liquid crystal display device according to claim 2, wherein the melt-formed portions of the at least one drain signal line was formed by melting corresponding portions of the at least one drain signal line by applying laser light to those portions.

4. A liquid crystal display device comprising:
a liquid crystal; and
two substrates opposed to each other with the liquid crystal interposed in between, the liquid crystal display device further comprising on a liquid-crystal-side surface of one of the two substrates:
an insulating film;
a plurality of gate signal lines formed at a position closer to the one substrate than the insulating film is;
a plurality of drain signal lines that cross the plurality of gate signal lines and are formed at a position closer to the liquid crystal than the insulating film is;
pixel regions each enclosed by two gate signal lines adjacent to each other and two drain signal lines adjacent to each other; a thin-film transistor that is provided in each pixel region and driven by a scanning signal supplied from one of the two gate signal lines that define the pixel region;
a pixel electrode that is provided in each pixel region and supplied, via the associated thin-film transistor, with a video signal from one of the two drain signal lines that define the pixel region;
a repair conductive layer formed at a position closer to the one substrate than the insulating film is so as to be contained in each of the plurality of drain signal lines when viewed perpendicularly and to be insulated from said each of the plurality of drain signal lines with the insulating film interposed in between; and
a light shield film so formed along at least one side of the repair conductive layer that the light shield film is insulated from the repair conductive layer, the drain signal line and the pixel electrode, and that the light shield film is overlapped with the pixel electrode along an extending direction of the drain signal line.

5. A liquid crystal display device according to claim 4, wherein the repair conductive layer is formed in the same layer and with the same material as the plurality of gate signal lines so as to be physically separated from gate signal lines adjacent to the repair conductive layer.

6. A liquid crystal display device comprising:
a liquid crystal; and
two substrates opposed to each other with the liquid crystal interposed in between, the liquid crystal display device further comprising on a liquid-crystal-side surface of one of the two substrates:
an insulating film;

a plurality of gate signal lines formed at a position closer to the one substrate than the insulating film is;

a plurality of drain signal lines that cross the plurality of gate signal lines and are formed at a position closer to the liquid crystal than the insulating film is;

pixel regions each enclosed by two gate signal lines adjacent to each other and two drain signal lines adjacent to each other;

a thin-film transistor that is provided in each pixel region and driven by a scanning signal supplied from one of the two gate signal lines that define the pixel region;

a pixel electrode that is provided in each pixel region and supplied, via the associated thin-film transistor, with a video signal from one of the two drain signal lines that define the pixel region;

a repair conductive layer formed at a position closer to the one substrate than the insulating film is so as to be contained in each of the plurality of drain signal lines when viewed perpendicularly and to be insulated from said each of the plurality of drain signal lines with the insulating film interposed in between; and a light shield film so formed along at least one side of the repair conductive layer that the light shield film is insulated from the repair conductive layer, the drain signal line and the pixel electrode, and that the light shield film is overlapped with the pixel electrode along an extending direction of the drain signal line, wherein at least one of the plurality of drain signal lines has a disconnected portion and melt-formed portions that are located on both sides of the disconnected portion and penetrate the insulating film.

7. A liquid crystal display device according to claim 6, wherein the melt-formed portions of the at least one drain signal line was formed by melting corresponding portions of the at least one drain signal line by applying laser light to those portions.

8. A liquid crystal display device according to claim 1, wherein the light shield film are formed along both sides of the repair conductive layer.

9. A liquid crystal display device according to claim 4, wherein the light shield film are formed along both sides of the repair conductive layer.

10. A liquid crystal display device according to claim 6, wherein the light shield film are formed along both sides of the repair conductive layer.

11. A liquid crystal display device comprising:

a liquid crystal; and two substrates opposed to each other with the liquid crystal interposed in between, the liquid crystal display device further comprising on a liquid-crystal-side surface of one of the two substrates:

a plurality of gate signal lines;

a plurality of drain signal lines that cross the plurality of gate signal lines;

pixel regions each enclosed by two gate signal lines adjacent to each other and two drain signal lines adjacent to each other;

a switching element that is provided in each pixel region and driven by a scanning signal supplied from one of the two gate signal lines that define the pixel region;

a pixel electrode that is provided in each pixel region and supplied, via the associated switching element, with a video signal from one of the two drain signal lines that define the pixel region;

an insulating film;

a repair conductive layer formed along each of the plurality of drain signal lines so as to be overlapped with said each of the plurality of drain signal lines when viewed perpendicularly and to be insulated from said each of the plurality of drain signal lines with the insulating film interposed in between; and a light shield film so formed along at least one side of the repair conductive layer that the light shield film is insulated from the repair conductive layer, the drain signal line and the pixel electrode, and that the light shield film is overlapped with the pixel electrode along an extending direction of the drain signal line.

12. A liquid crystal display device according to claim 11, wherein the light shield film are formed along both sides of the repair conductive layer.

* * * * *